United States Patent [19]

Burns

[11] Patent Number: 5,154,490

[45] Date of Patent: Oct. 13, 1992

[54] GROUND ENGAGING SURFACE FOR ENDLESS TRACKS AND WHEELS

[75] Inventor: Alan R. Burns, Mosman Park, Australia

[73] Assignee: Altrack Limited, West Perth, Australia

[21] Appl. No.: 391,505

[22] PCT Filed: Jan. 29, 1988

[86] PCT No.: PCT/AU88/00023

§ 371 Date: Jul. 25, 1989

§ 102(e) Date: Jul. 25, 1989

[87] PCT Pub. No.: WO88/05729

PCT Pub. Date: Aug. 11, 1988

[30] Foreign Application Priority Data

| Jan. 29, 1987 | [AU] | Australia | PI0094 |
| Feb. 26, 1987 | [AU] | Australia | PI0560 |
| Oct. 6, 1987 | [AU] | Australia | PI4756 |
| Nov. 3, 1987 | [AU] | Australia | PI5224 |

[51] Int. Cl.⁵ .................................... B60C 7/08
[52] U.S. Cl. .................... 301/44 B; 301/43; 301/5 R; 152/5; 152/308
[58] Field of Search ........... 301/5 R, 41 R, 43, 44, 301/44 T, 44 A, 44 B; 305/7, 19, 39, 51, 54, 55, 60; 404/121, 122, 124; 152/5, 7, 17, 42, 43, 300, 306, 308, 309

[56] References Cited

U.S. PATENT DOCUMENTS

| 826,405 | 7/1906 | Collier | 152/309 |
| 1,176,511 | 3/1916 | Zuber | 152/308 X |
| 1,395,432 | 11/1921 | Kroyer | 301/44 B |
| 2,008,954 | 7/1935 | Griebat | 301/44 B |
| 2,984,520 | 5/1961 | Wadell | 301/43 |
| 2,987,347 | 6/1961 | Cook et al. | |
| 3,427,078 | 2/1969 | Parsons | 305/34 X |
| 4,385,652 | 5/1983 | Frank | 305/45 X |
| 4,715,668 | 12/1987 | Burmeister | 305/35 EB X |

FOREIGN PATENT DOCUMENTS

| 0163002 | 7/1986 | Japan | 152/7 |
| 140895 | 9/1930 | Switzerland | 301/44 B |
| 207632 | 12/1923 | United Kingdom . | |
| 565646 | 11/1944 | United Kingdom | 301/43 |
| 857439 | 12/1960 | United Kingdom . | |
| 1416602 | 12/1975 | United Kingdom . | |

Primary Examiner—Russell D. Stormer
Attorney, Agent, or Firm—Handal & Morofsky

[57] ABSTRACT

A ground engaging means providing a running surface for wheels, endless tracks and the like, which is not pneumatic in nature, thereby not susceptible to puncture, and which is resiliently flexible to offer some resistance to shock. The ground engaging means comprises a base and a number of removable, hollow, tubular ground engaging elements which extend transversely of the direction of travel of the running surface. Said ground engaging elements include an inner face for engagement to the base and an outer face for contact with the ground surface, and angular shaped side faces between the inner and outer faces allowing for resilient flexibility under normal load conditions. It is preferable that the ground engaging elements are open at their ends to allow for dissipation of heat and are arranged in circumferential rows, defining a chevron pattern, to prevent resultant side thrust imposed upon the running surface. In addition, the ground engaging elements are constructed angularly to provide a line about which the side faces can flex, and include a flexible internal reinforcement means, built in to the walls of the faces of the ground engaging element to provide reinforcement for the ground engaging element, while maintaining flexibility.

5 Claims, 12 Drawing Sheets

GROUND ENGAGING SURFACE FOR ENDLESS TRACKS AND WHEELS

This invention relates to means providing a running surface for wheels, endless tracks and the like.

The present invention seeks to provide a running surface for wheels, endless tracks and the like which can resiliently flex so as to offer some resistance to shock and which is not pneumatic in nature and thereby not susceptible to puncturing as is the case with pneumatic tires.

In one form the invention resides in means providing a running surface comprising a base and a plurality of elongated, hollow ground engaging elements carried on the base, the ground engaging elements extending transversely of the direction of travel of the running surface and being of a construction so as to resiliently deform under load.

While the ground engaging elements may extend in a direction orthogonal to the direction of travel of the running surface, it is preferable that they are inclined to such direction. Furthermore, while each ground engaging element may extent the full width of the running surface, it is preferable that the elements are arranged in a fashion which does not impose a resultant side thrust on the running surface (such as circumferential rows arranged to define a chevron pattern). With a chevron pattern, there is in use no resultant side thrust imposed upon the running surface as would be the case with tubular elements extending in an inclined fashion across the full width of the running surface.

In circumstances where a running surface according to the invention is for use with a wheel, the base may simply be the rim of the wheel or a band adapted to be fitted onto the rim. In circumstances where a running surface according to the invention is for use with an endless track, the base may comprise a flexible endless band passing around end rollers thereby to constitute the endless track.

The ground engaging elements may be formed integral with the base, but for preference are formed separately of the base and fixed thereto. Preferably, the ground engaging elements are detachably fixed to the base by removable fixing means.

The ground engaging elements may be in the form of tubular elements which are preferably open at their ends. By being open at their ends, the tubular elements are ventilated to facilitate dissipation of heat.

In one arrangement, the tubular elements may be of a cross-section which presents an outwardly facing convex surface. With this arrangement, it is convenient for the tubular element to be partly circular in cross-section, having an arcuate portion and a generally flat web portion. The arcuate portion defines said convex surface and the web portion facilitates fixing of the element to said base. The generally flat web portion may be profiled to conform with curvature of the base. Alternatively, the tubular elements may be circular in cross-section.

In another arrangement, the tubular elements may be of a cross-section which provides an inner longitudinal face for engagement against the base, an outer longitudinal face for contacting the ground and longitudinal side faces between the inner and outer faces, the side faces being constructed to be resiliently flexible under normal load conditions. Each side face may be of angular or other construction so as to provide a line about which it can flex. The outer face may be provided with a tread formation.

The tubular elements may be formed from rubber or other elastomeric material. The rubber or other elastomeric material may be provided with reinforcement.

In still another arrangement, the elongated hollow tubular elements may be in the form of loops which are preferably formed from a length of resilient material arranged in sinuous formation having alternating crests and troughs, the length of material being secured to the base at locations corresponding to at least some of the troughs.

There may be provided at least one further row of said loops, the loops of each row being staggered with respect to the loops in a neighbouring row. In this way, the ground engaging surface can travel over the ground in a more uniform manner.

Where the ground engaging surface is associated with a tire, the length of resilient material may be anchored to the peripheral surface of a wheel on which the tire is to be mounted or onto a band which can be located onto the rim of such a wheel. Where the ground engaging surface is associated with an endless track, the length of material is secured to an inner band of flexible material so as to constitute an endless track which in use is fitted around spaced rollers forming part of the endless track drive system.

The hollow ground engaging elements may be defined by a plurality of segments located one adjacent another around the running surface with each segment being detachably fixed to said base.

Each segment may carry one or more tubular elements.

In one embodiment, each segment has a pair of oppositely extending mounting flanges each adapted to co-operate with the neighboring flange on the next adjacent segment in such a manner that the co-operating flanges are positioned one upon the other to receive common anchoring means. The common anchoring means may comprise one or more bolts each extending through aligned mounting holes in the co-operating flanges and the base.

In a further embodiment, each segment carries one tubular element and includes an opening extending along the tubular element, a mounting flange provided on each longitudinal side of the opening, each mounting flange being constructed of a plurality of spaced flange sections, the flange sections and spacings therebetween of one mounting flange being complementary to the flange sections and spacings therebetween of the other mounting flange, each flange section including an outwardly extending portion extending away from said opening and an inwardly extending portion extending into said opening, whereby the flange sections of co-operating mounting flanges inter-engage in a manner such that the flange sections of each mounting flange located in the spacings between flange sections of the other mounting flange. Preferably said segment is detachably fixed to said base by anchoring means disposed in said tubular element and engaging said inwardly extending flange sections of said segment and further engaging outwardly extending flange sections of co-operating flanges of respective neighboring segments.

In another form the invention resides in a ground engaging member for a wheel or endless track comprising a tubular element of resiliently flexible construction having a cross-section presenting an outwardly facing convex surface.

The tubular element of the ground engaging member may comprise an arcuate portion defining said convex surface and a generally flat web portion extending across said convex portion.

In still another form the invention resides in a ground engaging member for a wheel or endless track comprising a tubular element having an inner longitudinal face for engagement against part of the wheel or endless track, an outer longitudinal face for contacting the ground and longitudinal side faces between the inner and outer faces, the side faces being constructed to be resiliently flexible.

In still another form the invention resides in a segment carrying at least one elongated ground engaging element, the segment comprises a body including said at least one elongated ground engaging element, the body having a mounting face a pair of mounting flanges provide on opposed sides of the body and extending longitudinally with respect to said at least one ground engaging element, one flange having a face co-planar with said mounting face and the other flange having a corresponding face spaced from said mounting face by an amount corresponding to the thickness of said one flange.

Preferably the interior of said at least one elongated ground engaging element opens onto said mounting face.

Preferably the interior of said at least one elongated ground engaging element opens onto said mounting face for the entire length of the ground engaging element.

In still another form the invention resides in a segment carrying a ground engaging element for a wheel or endless track, said segment including an opening extending along the tubular element, a mounting flange provided on each longitudinal side of the opening, each mounting flange being constructed of a plurality of spaced flange sections, the flange sections and spacings therebetween of one mounting flange being complementary to the flange sections and spacings therebetween of the other mounting flange, each flange section including an outwardly extending portion extending away from said opening and an inwardly extending portion extending into said opening.

The invention will be better understood by reference to the following description of several specific embodiments thereof as shown in the accompanying drawings, in which.

Figure 1:
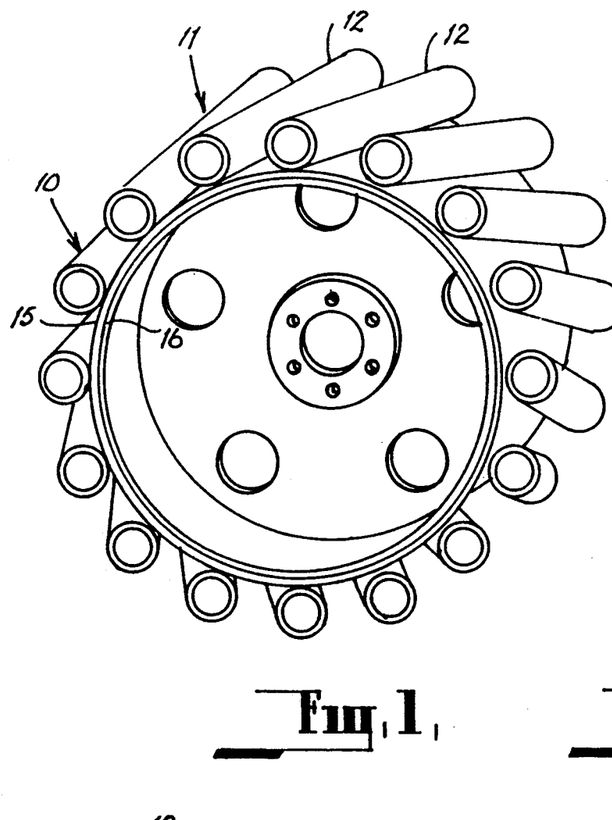
FIG. 1 is an isometric view of a wheel fitted with means providing a running surface according to the first embodiment.
Figure 2:
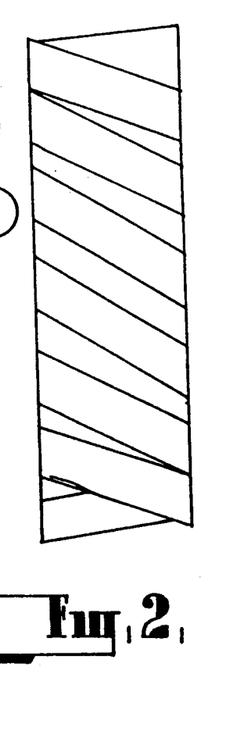
FIG. 2 is an end view of the running surface of FIG. 1.
Figure 3:
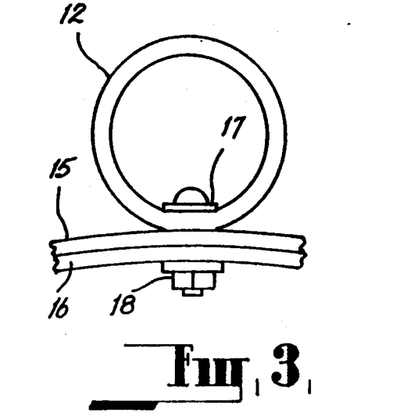
FIG. 3 is a view of part of the running surface of the first embodiment, showing the profile of the tubular elements.

The embodiment shown in FIGS. 1, 2 and 3 of the drawings is directed to a means 10 providing a running surface 11 for a wheel of a work vehicle such as an earth moving machine or agricultural machine.

The running surface 11 comprises a plurality of spaced tubular elements 12 mounted on the outer periphery of an endless base 15 which in use is fitted onto the rim 16 of the vehicle wheel. The tubular elements 12 extend transversely of the direction of travel of the running surface, as best seen in FIGS. 1 and 2 of the drawings.

The tubular elements are of a construction so as to deform resiliently under normal load conditions. In this embodiment, the tubular element are each of circular cross-section and formed from a length of heavy duty mining hose. Each tubular element is fixed to the base 15 by means of a reinforcing strip 17 which is positioned within the tubular element and secured to the base 15 and the rim 16 by fixing elements 18 in the form nut and bolt assemblies, as best seen in FIG. 3 of the drawings.

Figure 4:
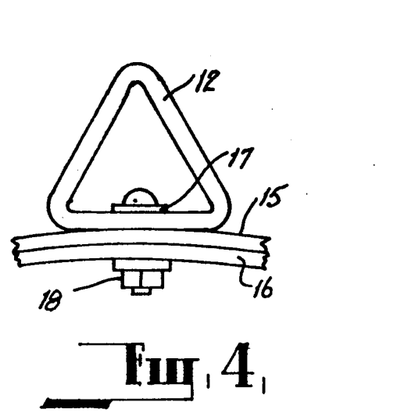
FIG. 4 is a view similar to FIG. 3, showing the profile of another form of tubular element.

Referring now to FIG. 4 of the drawings, the running surface according to the second embodiment is similar to that of the first embodiment which the exception that the tubular elements 12 are substantially triangular in cross-section rather than circular.

Figure 5:
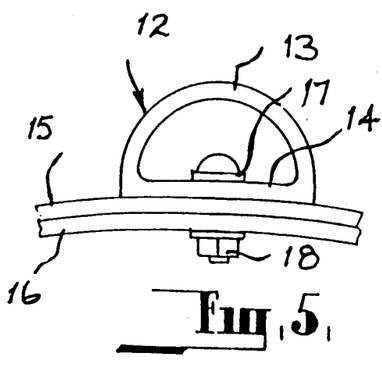
FIG. 5 is also a view similar to FIG. 3, showing the profile of still another form of tubular element.

Referring now to FIG. 5 of the drawings, the running surface according to the third embodiment is also similar to that of the first embodiment with the exception that the tubular elements 12 are part circular in cross-section, having an arcuate portion 13 and a web portion 14 at which the tubular element is fixed to the base 15.

In the running surfaces according to the embodiments described previously, the tubular elements 12 extends transversely of the direction of travel of the running surface for the full width of the running surface, as best shown in FIG. 2 of the drawings. This arrangement has a deficiency in travel in that a side thrust is imposed upon the portion of the running surface in contact with the ground owing to the particular arrangement of the tubular elements.

Figure 6:
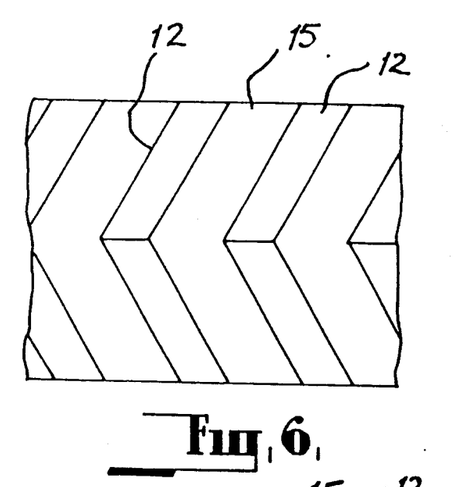
FIG. 6 is a fragmentary view showing a pattern in which tubular elements may be arranged as an alternative to the pattern in the first embodiment as illustrated in FIG. 2.

FIG. 6 of the drawings shows an alternative arrangement of tubular element in which elements are arranged in a chevron pattern. This arrangement has the benefit that in travel there is no resultant side thrust imposed upon the portion of the running surface in contact with the ground. A separate tubular element may provide each arm of the chevron or each tubular element may be so configured as to provide two arms of the chevron.

Figure 7:
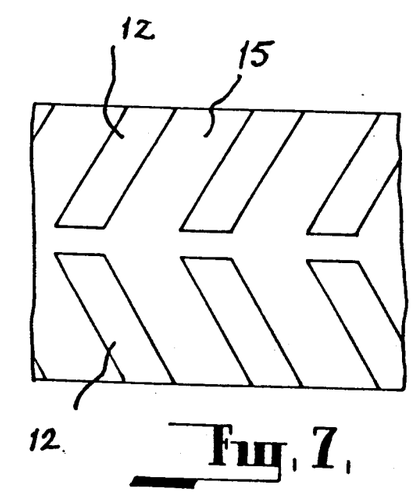
FIG. 7 is a fragmentary view illustrating a further pattern in which the tubular element may be arranged.
Figure 8:
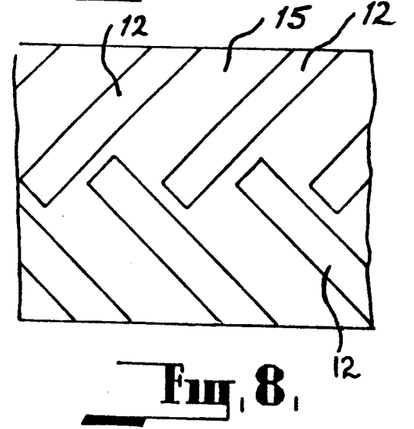
FIG. 8 is a fragmentary view illustrating a still further pattern in which the tubular elements may be arranged.

FIGS. 7 and 8 of the drawings illustrates still further alternative arrangements for the tubular elements.

Because the tubular elements 12 are constructed to resiliently deform under normal load conditions, the running surface has the ability to at least partly cushion bumps and surface irregularities encountered as it travels over the ground. The resilient nature of the tubular elements permits the running surface to operate on finished road surfaces, while also providing traction in circumstances where unstable ground, such as loose soil, is encountered.

Figures 9, 11:
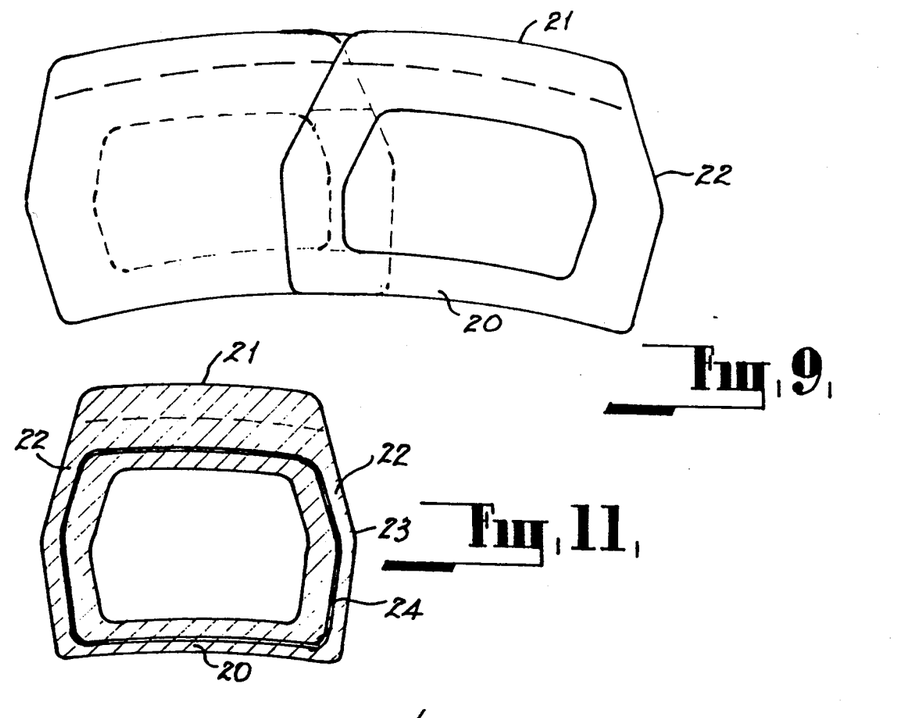
FIG. 9 is an end view of a further form of tubular element.
FIG. 11 is a cross-section on line 11—11 of FIG. 10.
Figure 10:
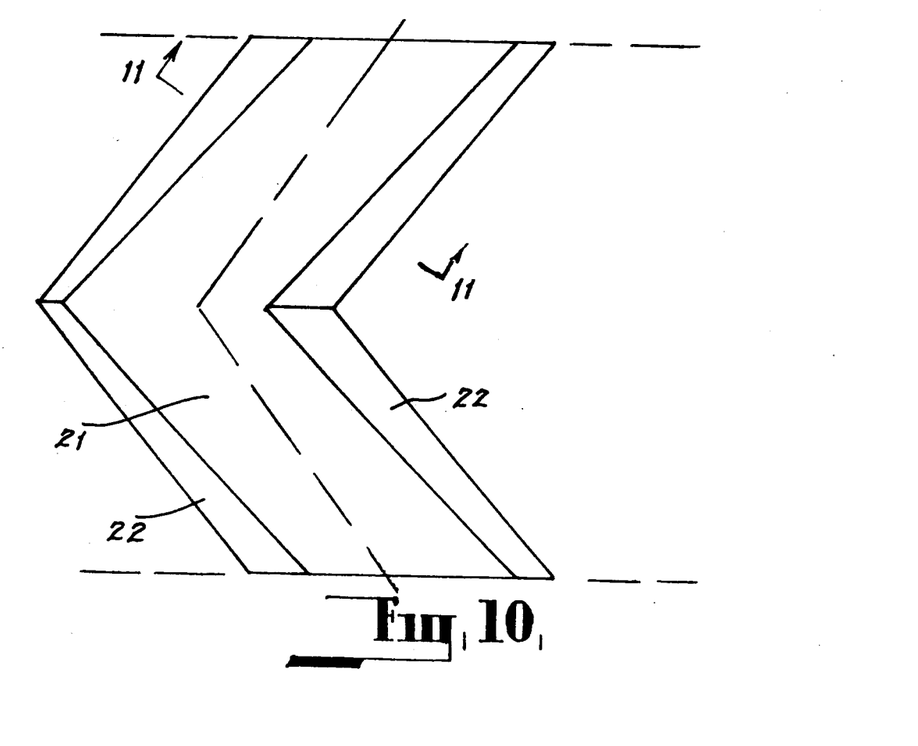
FIG. 10 is a plan view of the tubular element shown in FIG. 9.
Figure 12:
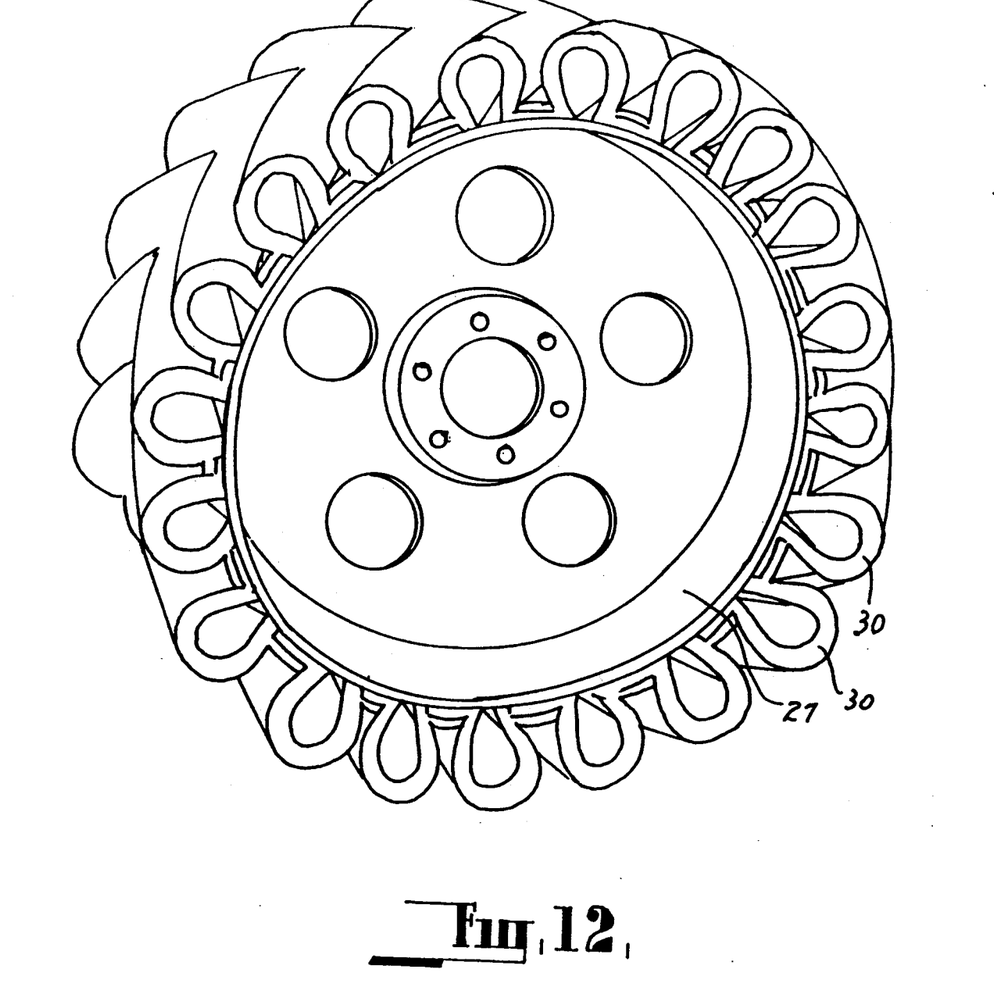
FIG. 12 is a schematic perspective view of a wheel fitted with means providing running surface constructed according to a further embodiment.
Figure 13:
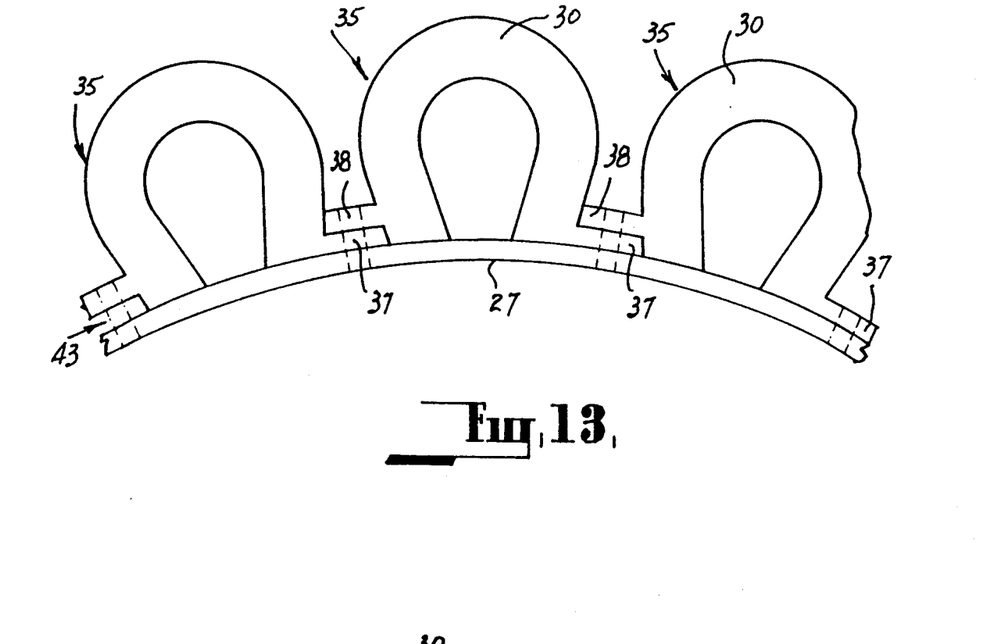
FIG. 13 is a fragmentary view showing part of the running surface of the wheel of FIG. 12 in more detail.

The tubular element shown in FIGS. 9, 10 and 11 comprises an inner longitudinal face 20 for detachable engagement against the base, an outer longitudinal face 21 for contacting the ground and longitudinal side faces 22 between the inner and outer faces.

The side faces 22 are constructed to deform resiliently under normal load conditions. In particular, each side face 22 is of angular construction to provide a line at 23 extending along the length of the face about which the face can flex.

The outer face 21 is provided with a tread formation (not shown).

The tubular element is provided with internal reinforcement means 24 (as shown in FIG. 11) which reinforces the element while allowing resilient deformation in the manner described.

The tubular element is configured into a V-formation (as best seen in FIG. 10) so as to provide a chevron pattern on the wheel.

The embodiment shown in FIGS. 12 to 16 of the drawings is directed to means providing a running surface for a wheel having a rim 27. The running surface is provided by a plurality of tubular elements 30 adapted to be detachably mounted onto the rim 27. The tubular elements 30 extend transversely of the direction of travel of the running surface and are configured in a V-formation chevron pattern so as to provide a chevron pattern on the wheel.

The tubular elements 30 are formed of resiliently flexible material so as to deform resiliently under load thereby to provide cushioning. They are of generally circular cross-section, with an opening 34 extending longitudinally along the bottom thereof. The ends of the tubular elements are also open.

The tubular elements 30 are defined by segments 35 releasably mounted on the wheel rim 27 one adjacent another circumferentially around the running surface, with the inner face 36 of each segment located against the rim. In this embodiment, each segment 35 defines one tubular element 30 although it may be constructed to define a plurality of elements. Each segment is provided with a pair of oppositely projecting flanges 37, 38 each adapted to co-operate with the neighboring flange on the next adjacent segment in such a manner that the co-operating flanges are positioned one upon the other to receive a common anchoring means (not shown). More particularly, the flange 37, 38 extend longitudinally with respect to the tubular element. The flange 37 is so positioned as to provide a mounting face 39 which is co-planar with the inner face 36 of the segment 35 and which is adapted to locate against the rim 27. Flange 38 provides a mounting face 41 which is outwardly spaced from the inner face 36 of the segment by an amount corresponding to the thickness of flange 37. Thus, space 43 defined between mounting face 41 of flange 38 and the plane of the inner face 36 of the segment 35 provides a longitudinal cavity for receiving flange 37 of the immediately adjacent segment. In this way, flange 38 of any one segment and the flange 37 of the immediately adjacent segment co-operate in the manner described previously.

Figure 14:
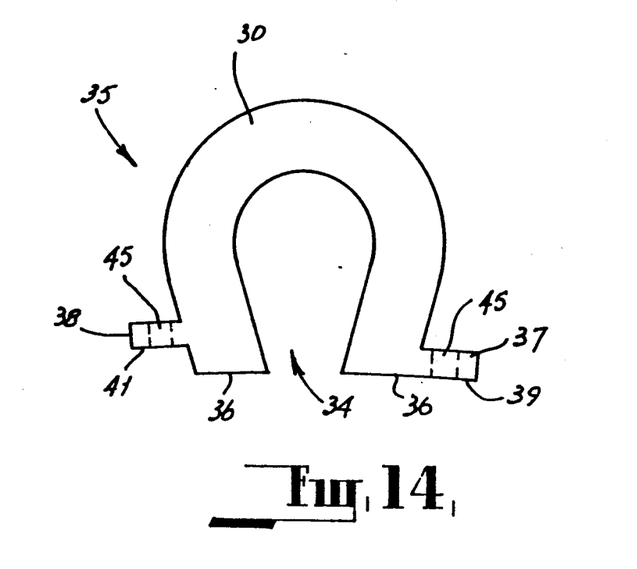
FIG. 14 is an end view of a segment which forms part of the running surface shown in FIG. 12.
Figure 15:
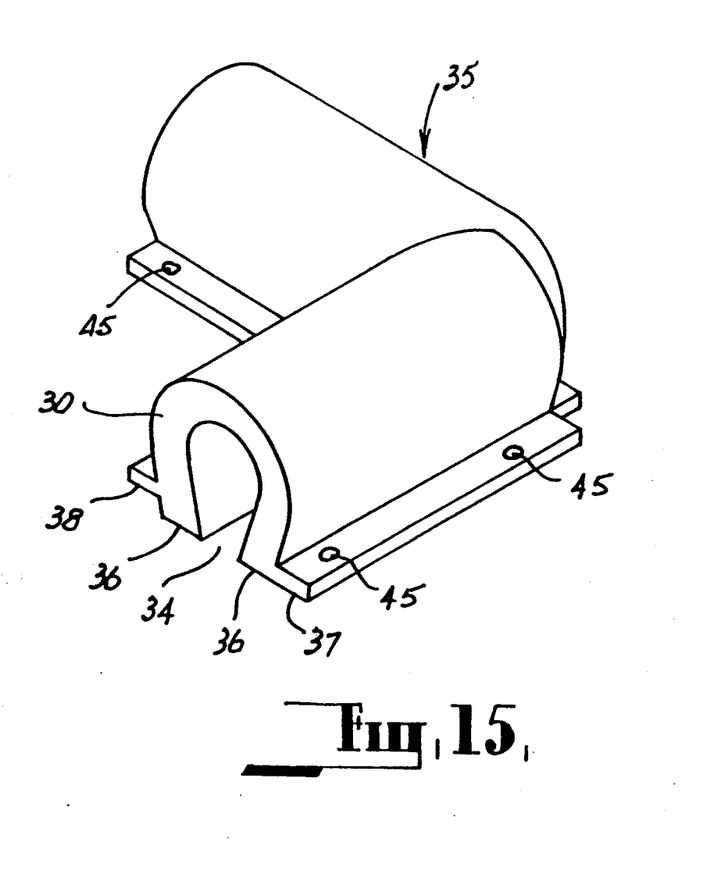
FIG. 15 is a perspective view of the segment shown in FIG. 14.

The flanges 37 and 38 are each provided with longitudinally spaced mounting holes 45. Corresponding mounting holes 45 of co-operating flanges are arranged to align with one another to receive said common anchoring means in the form of bolts which anchor the co-operating flanges to the rim 27. With this mounting arrangement, the segments can be easily replaced on an individual basis in the event of damage.

Figure 16:
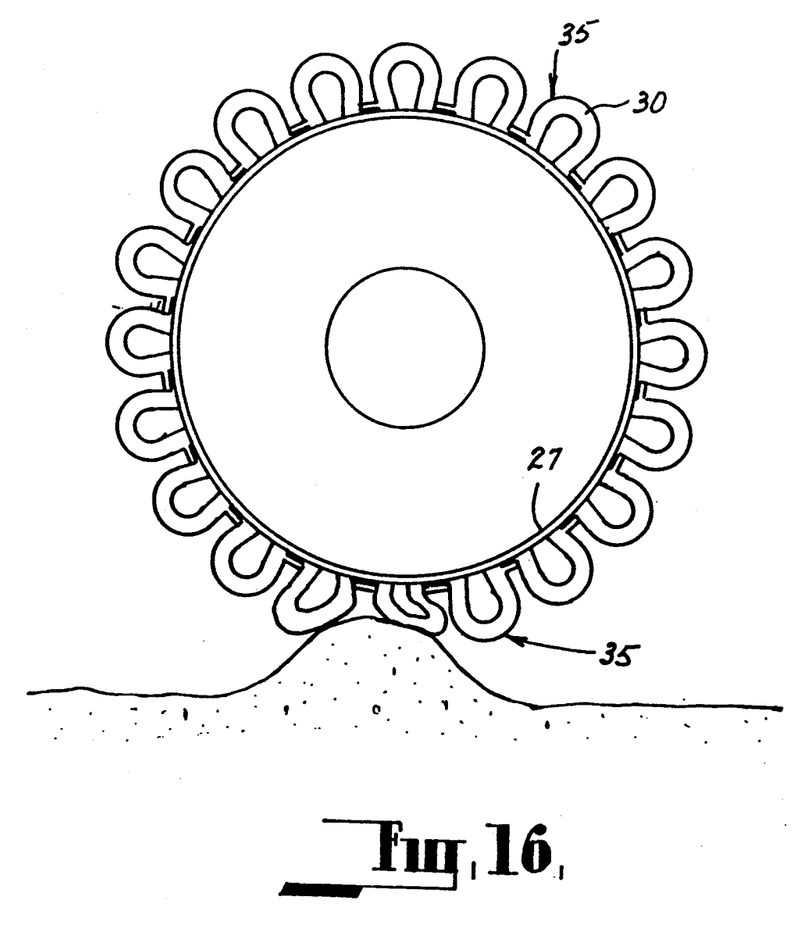
FIG. 16 is a schematic side view of the wheel shown in FIG. 12 with the running surface deformed on encountering an obstacle.

FIG. 16 illustrates several tubular elements 30 in a deformed state as a result of encountering an obstacle in the path of the wheel.

The embodiment shown in FIGS. 17 to 20 is directed to a running surface which is somewhat similar to that of the last preceding embodiment with the exception of differences in the construction of the segment 35.

In this embodiment, the segments 35 each comprise a tubular element 51 having an opening 53 extending longitudinally along the tubular element. On both longitudinal sides of the opening 53 there are mounting flanges 55, 57. The mounting flanges 55, 57, which are separated by space 58, co-operate to define a mounting face 59 for engagement against the outer periphery of the wheel rim 27.

Figures 19, 20:
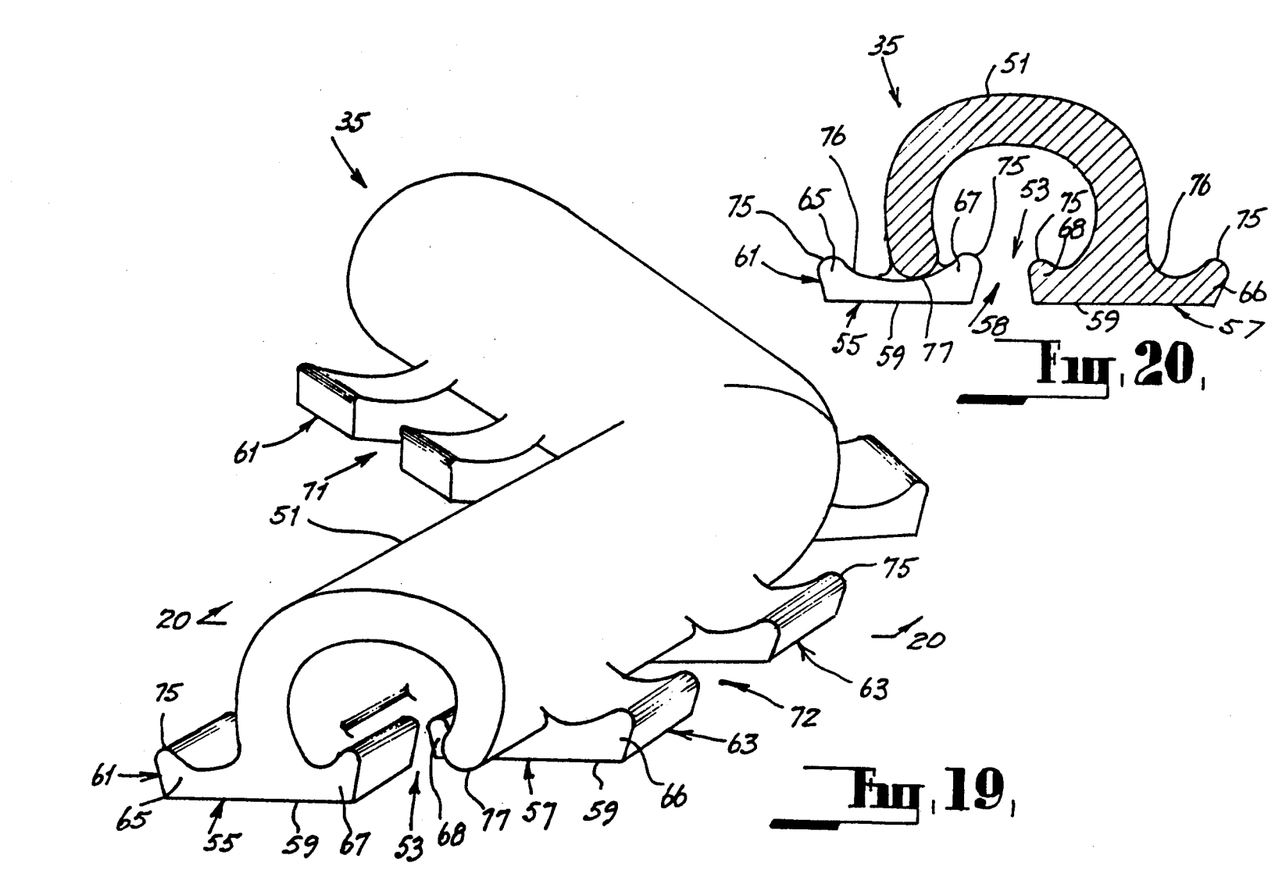
FIG. 19 is an perspective view of a segment from which running surface according to the embodiment of FIG. 17 is constructed.
FIG. 20 is a section on line 20—20 of FIG. 19.

The mounting flange 55 is defined by a plurality of flange sections 61 spaced regularly along the line of the flange. The spacing between successive flange sections 61 are identified by reference numeral 71. Similarly, the mounting flange 57 is defined by a plurality of flange sections 63 spaced regularly along the length of the flange and in complementary relationship to flange sections 61 of flange 55. The spacings between successive flange sections 63 are identified by reference numeral 72.

Each mounting flange section 61 has outwardly extending portion 65 which extends away from the opening 53 in the tubular element and an inwardly extending portion 67 which extends into the opening. Similarly, each mounted flange section 63 has an outwardly extending portion 66 which extends away from the opening 53 and an inwardly extending portion 68 which extends into the opening.

Figure 18:
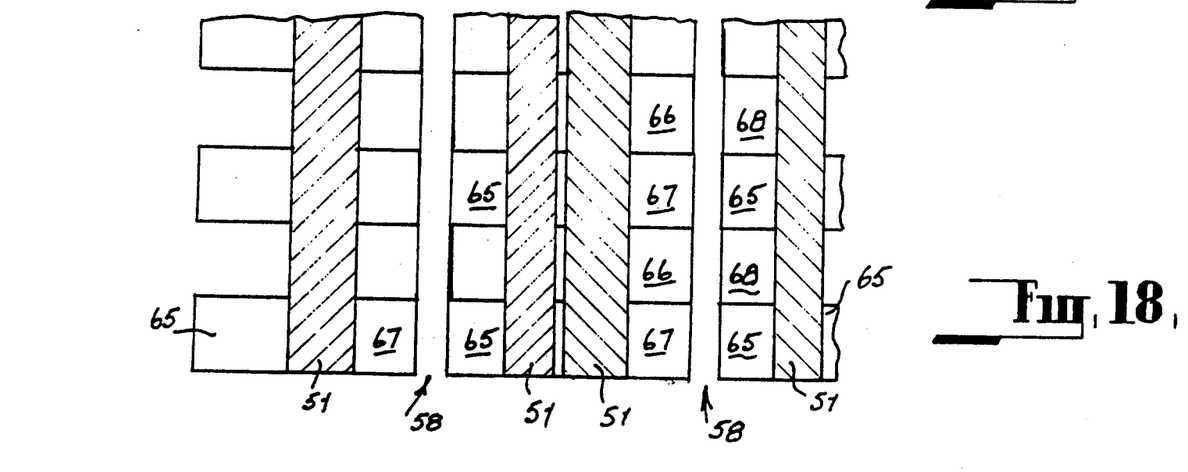
FIG. 18 is a section on line 18—18 of FIG. 17, with segment anchoring means removed to reveal the mounting flanges.

When the segments are mounted one adjacent another around the periphery of the wheel rim, flange 55 of each segment inter-engages with complementary flange 57 of the neighboring segment. More particularly, flange sections of each flange locate in the spacings between the flange sections of the other flange, with the outwardly directed flange portions each flange locating adjacent, and co-operating with, the inwardly directed flange portions of the complementary flange. Thus, on each side of the space 58 there is a set of co-operating flange portions, one set being co-operating flange portions 66 and 67 and the other set being co-operating flange portions 65 and 68, as best seen in FIG. 18.

Figure 17:
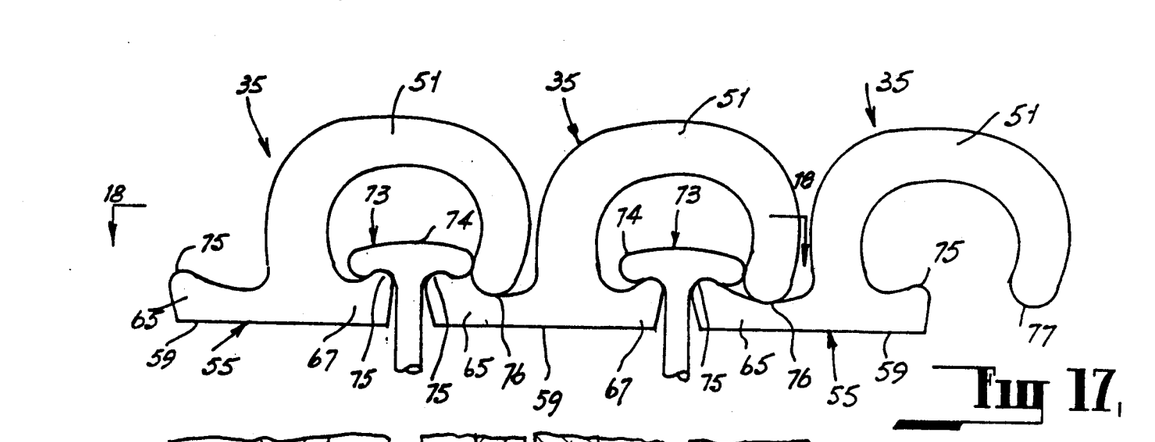
FIG. 17 is a fragmentary view of part of a running surface of a wheel, the running surface being constructed according to a still further embodiment.

The co-operating flange portions are detachably fixed to the wheel rim by an anchoring means 73 in the form of an anchoring strap 74 which extends along the tublar element and bridges the two sets of co-operating flanges.

The anchoring strap 74 is bolted or otherwise secured to the periphery of the wheel rim. It will be noted that the anchoring means are not shown in FIG. 18 to permit illustration of the co-operating flange portions.

Each flange 55, 57 is formed with raised rib 75 adjacent the free edge on the face opposite to the mounting face 59. The raised ribs 75 facilitate positive engagement between the anchoring strap 74 and the flanges.

The outwardly directed flange portions 65, 66 are also profiled at 76 to provide a seat for the portion 77 of the tubular element which bridges the spaced flange sections 61, 63.

The mounting arrangement permits any segment to be replaced easily if it becomes damaged.

The embodiment shown in FIGS. 21 to 24 of the drawings is directed to a ground engaging surface in the form of a tire 81 for a wheel 83.

The tire 81 comprises a plurality of rows of hollow, ground engaging elements 85, there being three such rows shown in this embodiment. Each element 85 is provided by a loop of resilient material.

The loops in each row are formed by a length of elastomeric material 87 arranged in sinuous formation having a plurality of crests and troughs. The length of the material is anchored to the peripheral rim of the wheel 83 by fixing means 89 at locations corresponding to each of the troughs. The fixing means 89 are each in the form of a reinforcing plate 90 anchored to the rim of the wheel by bolts.

Figure 21:
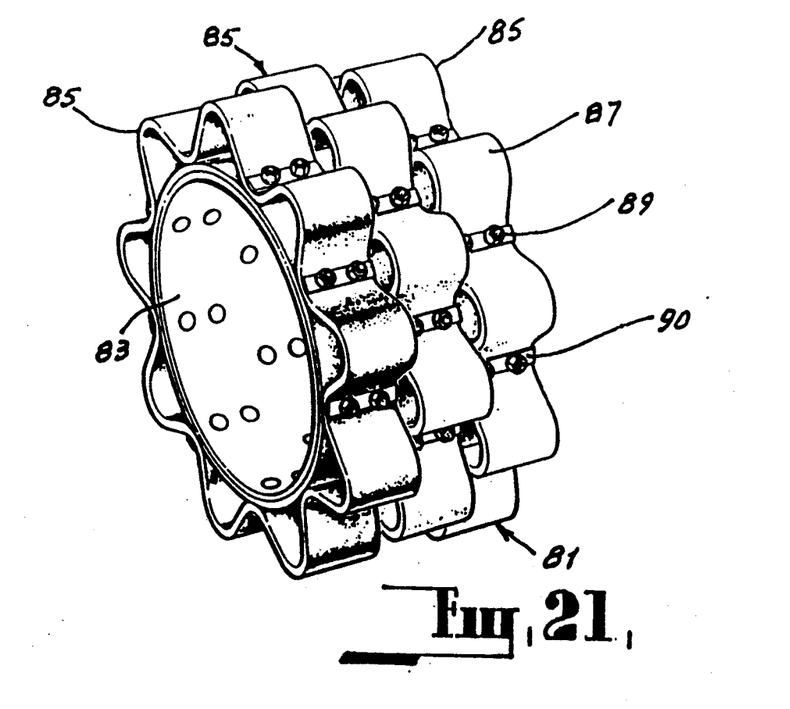
FIG. 21 is a perspective view of a running surface according to a still embodiment mounted on a wheel so as to provide a tire for the wheel.

The ground engaging elements of each row are offset with respect to the ground engaging elements in neighbouring rows, as best seen in FIG. 21 of the drawings. In this way, the tire has a peripheral surface which can roll in a more uniform manner than it would be capable of if the tread elements in each row were transversely aligned.

Figures 22, 23, 24:
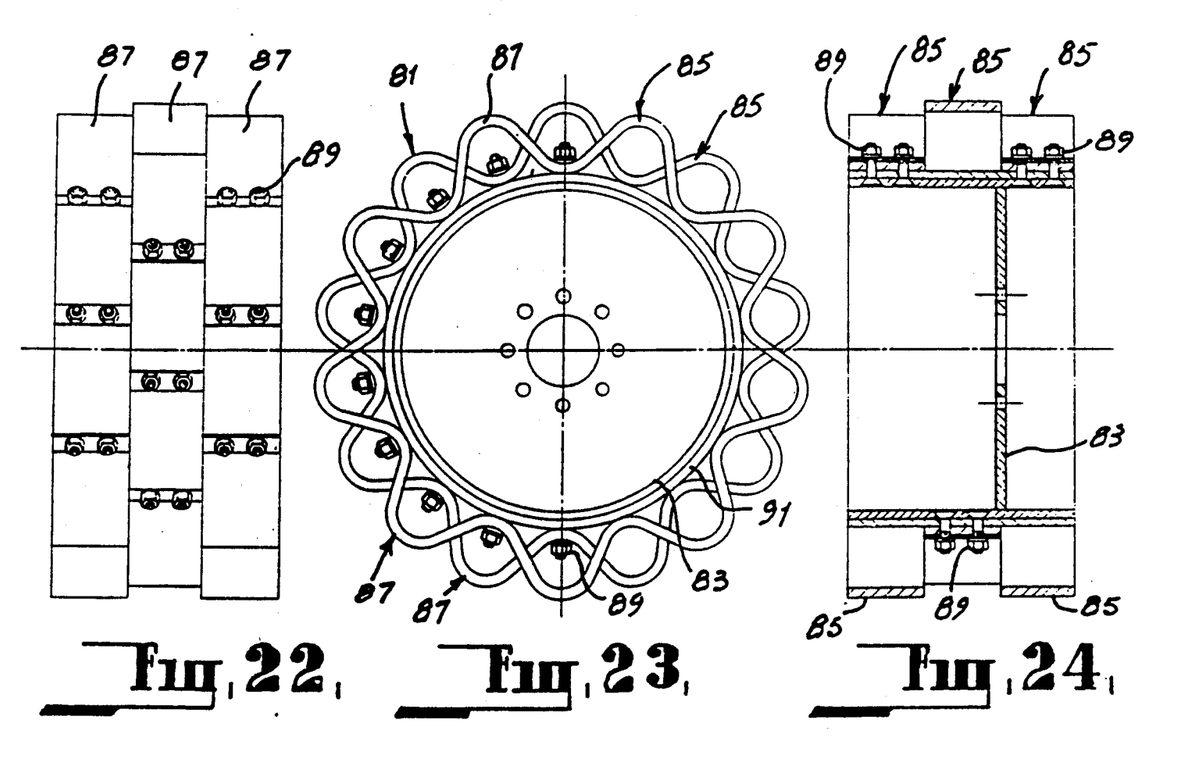
FIG. 22 is a side view of FIG. 21.
FIG. 23 is an end view of the arrangement of FIG. 21.
FIG. 24 is a section along the line 24—24 of FIG. 22.

While the sinuous length of material may be located directly on the peripheral rim of the wheel, in this embodiment they located on an inner 91 which is fitted onto the rim of the wheel.

The ground engaging elements 85 provide the wheel with traction when operating on unstable ground. Because of their resilient nature, the tread elements can deform when the wheel is operating on finished road surfaces. This is beneficial in that it reduces the likelihood of damage to the finished road surface and provides a degree of springing which at least partially absorbs shock forces resulting from bumps and other surface irregularities encountered in the part of the wheel.

Figure 25:
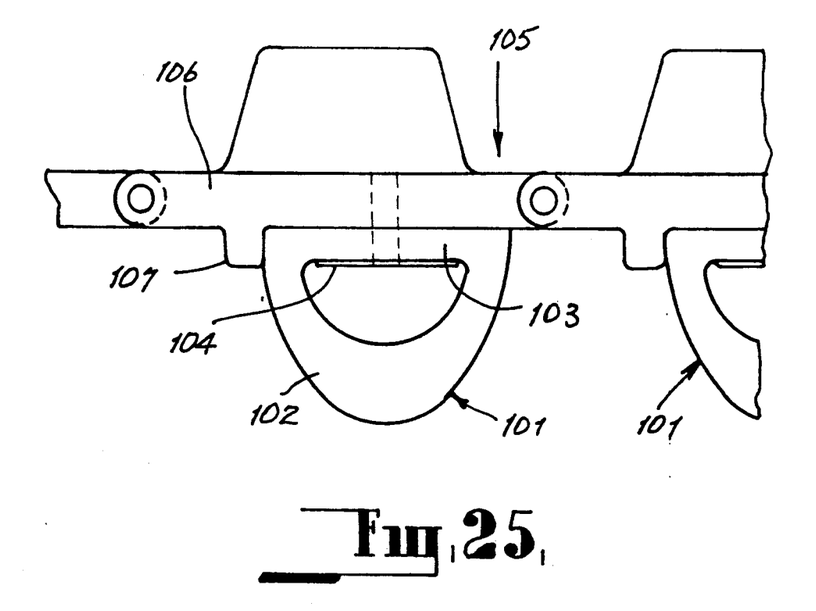
FIG. 25 is a part-sectional elevational of one form of endless track according to a further embodiment.
Figure 26:
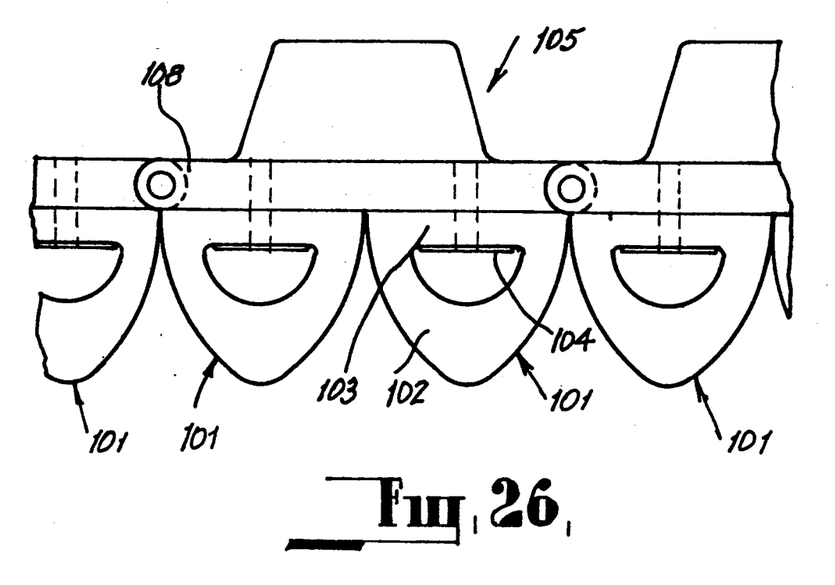
FIG. 26 is a part-sectional elevation of a second form of a track according to the embodiment of FIG. 25.

The embodiment shown in FIGS. 25 and 26 is directed to a ground engaging element which can be applied to the existing tracks of vehicles which are supported by endless tracks such as earth moving equipment and military equipment. It is a function of the embodiment to provide a means for converting the tracks of endless tracks vehicles for such vehicles to be able to run on roads without causing damage to the road. It is believed that such conversion will enable the vehicle to be used in off-road circumstance with a reduced possibility of bogging than with present conversion systems. According to current techniques of converting endless tracks to a form suitable for running on roads, the aggression provided by the track is greatly eliminated and in order for a vehicle to be able to be used again in off road conditions it is necessary that the tracks be reconverted.

The present embodiment comprises utilization of ground engaging elements which are of tubular configuration and partly circular cross-section. The elements 101 are formed with an arcuate portion 102 interconnected by a substantially flat web portion 103. The interior face of the flat web portion is associated with a reinforcing strip 104 which extends substantially with full width of the web 103. A number of holes (not shown) are provided in the length of the flat web 103 and the reinforcing plate 104 to facilitate fixing to an endless track. As shown in the drawings, the ground engaging elements 101 are applied in side by side parallel relationship transversely across an endless track 105 whereby the arcuate portion 102 provides the support surface for the track.

In the case of vehicles formed with a grouser plate 106, the ground engaging elements 101 are fixed between the upstanding ribs 105 of the grouser plates. In this case of earth moving equipment which utilise chain elements 108 the elements are mounted to the chains of the endless track of the vehicle.

As a result of the embodiment a resilient ground engaging surface is provided which avoids the damage to a road surface that would be otherwise caused by the use of unprotected conventional endless tracks utilized with military and earth moving vehicles. In addition in the event that the converted vehicle is required for immediate off road use the converted track has inherent aggression which facilitates such utilization with a reduced possibility of bogging. In the case of military vehicles there is no time lost in converting a vehicle for use from off road to on road use or vice versa.

It should be appreciated that the scope of the invention is not limited to the scope of the embodiment described. It should in particular be understood embodiments described can be applied to either wheels or endless tracks even though they may have been described in relation to only one application.

I claim:

1. A segment carrying a tubular ground engaging element for a wheel or endless track, said segment including an opening extending along the tubular element, a mounting flange provided on each longitudinal side of the opening, each mounting flange being constructed of a plurality of spaced flange sections, the flange sections and spacings therebetween of one mounting flange being complementary to the flange sections and spacings therebetween of the other mounting flange, each flange section including an outwardly extending portion extending away from said opening and an inwardly extending portion extending into said opening.

2. A segment according to claim 1 wherein the mounting flanges are provided with raised ribs to facilitate positive engagement with anchoring means.

3. A segment according to claim 1 or 2 wherein said outwardly directed flange portions are each provided with a seat to receive the portion of the tubular element of the neighbouring segment which bridges the spaced flange sections of said neighboring segment.

4. A ground engaging member for a wheel or endless track configured as a hollow, v-shaped tubular element, comprising a v-shaped longitudinal inner face configured for engagement with part of said wheel or endless track, a v-shaped longitudinal outer face for contacting the ground, forward and rearward longitudinal side faces each extending between respective sides of said inner face and said outer face, each of said longitudinal side faces comprising an upper portion adjacent to the respective sides of said outer face and a lower portion adjacent to the respective sides of said inner face, each said upper portion being oriented at an angle to a respective lower portion, said upper and lower portions meeting to form a juncture about which flexure may occur, said side faces being configured to define together with said inner and outer faces ends open to the atmosphere, wherein said upper portions meet together at an angle and form a juncture in accordance with the v-shape of said outer face and said lower portion of each of said longitudinal side faces meeting at an angle and forming a juncture in accordance with the v-shape of said inner face and meeting with the juncture between said upper portion of each of said longitudinal side faces.

5. A ground engaging element as claimed in claim 4 further comprising an internal reinforcing member of sufficient flexibility to allow for resilient flexing along the juncture of said longitudinal side faces.

* * * * *